March 3, 1942.  F. E. BRYANT  2,274,973
CONTAINER COMBINATION
Filed July 13, 1940
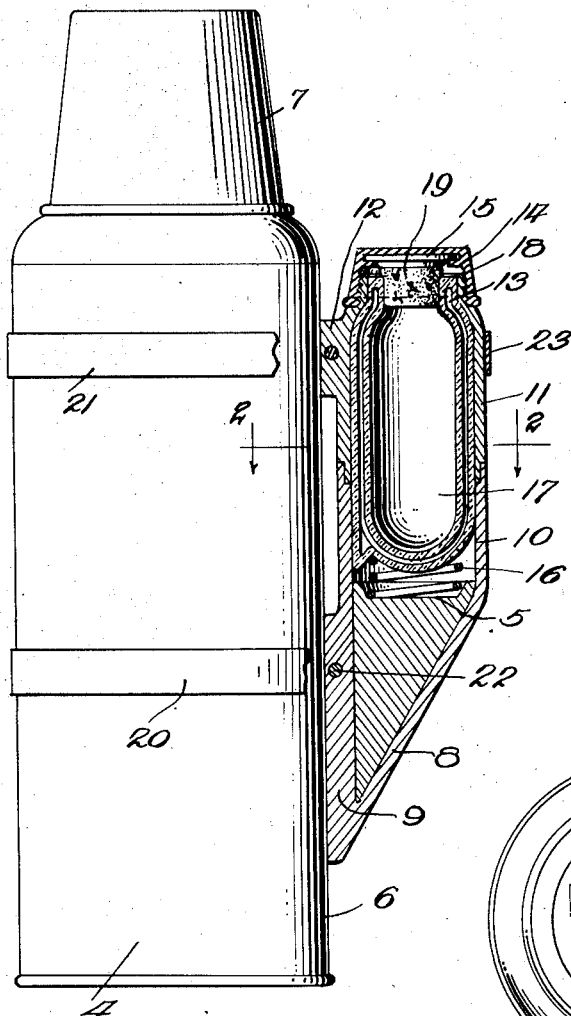
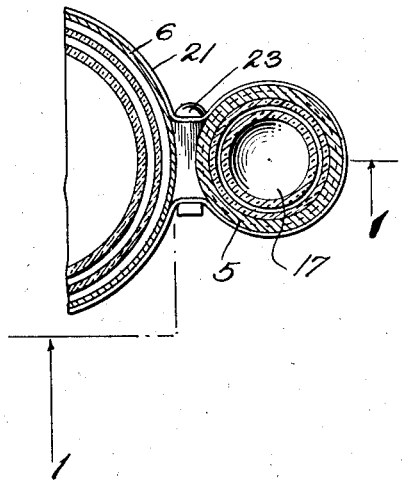
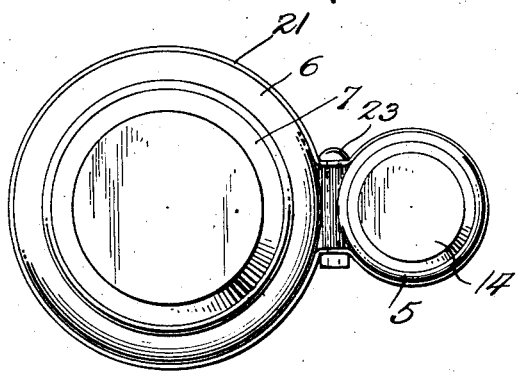
Ferrell E. Bryant
Inventor
By Elmer Stuart
Attorney Patented Mar. 3, 1942

2,274,973

UNITED STATES PATENT OFFICE 2,274,973

CONTAINER COMBINATION

Ferrell E. Bryant, Barberton, Ohio

Application July 13, 1940, Serial No. 345,410

7 Claims. (Cl. 215—13)

The following description relates to my invention in the combination of a container with a separable handle which in itself may contain a vessel or the like.

It is usual to combine a container and a vessel in which materials such as beverages or even solid food may be preserved over a space of time without material change in temperature. Such devices may rely upon insulation in the walls of the container or the inner vessel may be of double walled construction with the intervening space evacuated. Such devices are well known as effective means for preventing the loss of heat from the contained material or in the alternative of preventing that material from absorbing heat from without.

Containers of this type are awkward to handle if their capacity is adequate. One of the objects of my invention is to provide a handle on such container which will facilitate the carriage and use of the container.

One of the problems in the use of such containers is the fact that when heated beverages are kept for several hours, there may be undesirable alteration in the material. For example, beverages containing milk are apt to curdle and other beverages such as those containing chocolate may become rancid or sour due to the presence of a minor proportion of some desirable ingredient. A further object of my invention is to provide means by which the ingredients may be preserved separately at desired temperatures and mixed when desired. Thus a portion of cream may be carried and preserved separately from hot coffee and the mixture prepared when it is desired to use the beverage. Another suggested use is the carriage of some medicinal ingredient or one having effervescent or flavoring imparting properties which could not be held in the main quantity of beverage. It will also be found that my invention permits the carriage of two separate beverages or the like which are to be taken in succession rather than mixed.

It is also an object of my invention to provide separate vessels in which different ingredients may be preserved at desired temperatures and dispensed selectively.

In carrying out my invention I have designed a device which may be applied to existing containers now on the market and is of universal applicability. Thus the part containing the second or smaller vessel may form the subject of separate merchandising and the purchaser may combine it with available containers to suit his own convenience and preference.

I have shown in the accompanying drawing the preferred form of my invention by way of example. In the drawing Fig. 1 is a side elevation partly in vertical section on the line 1—1 of Fig. 2, showing the combined container and associated or attached handle;

Fig. 2 is a fragmentary transverse section on the line 2—2 of Fig. 1 and

Fig. 3 is a top plan view of the same.

Essentially the invention consists in a convenient combination of a container 4 and a handle member 5. The container 4 is typical of the vacuum or thermos type of bottle having a sheet metal outer casing 6 generally cylindrical. The upper end of the casing is tapered in to house the neck of an inner vessel, not illustrated in which the beverage or other material is carried.

The usual cup-like screw top 7 completes the container. Such a structure is typical of many at present on the market.

As pointed out above, when an adequate capacity is given this device it becomes awkward to handle. For greater convenience in handling and also to provide a second compartment or one for separate material and an ingredient which should be stored separately, I have provided the hollow handle member 5. This may be formed of sheet metal, plastics or other compositions in accordance with the wish of the manufacturer. The handle has been shown to have a tapering or pointed bottom 8, one side of which is prolonged to form an extended seating projection 9. This seating projection has a surface conforming to the curvature of the container 6.

The main and upper portions of the handle 5 are hollow to form a chamber 10. For convenience in manufacture I have shown the upper section 11 of the handle to be constructed as a separate cylinder having a sliding frictional fit with the lower section. The upper portion of the handle has an inwardly extending projection 12 vertically disposed with respect to the projection 9. Projection 12 is similarly concave on its front face as shown in Figs. 2 and 3 to conform to the curvature of the container 6. The section 11 is restricted as shown at 13 in Fig. 1 to form a screw-threaded neck. A cap 14 similarly screw-threaded fits on the neck 13. A cushion pad 15 is provided on the inner surface of the cap 14.

The hollow chamber 10 has a helical spring 16 resting at its bottom end and supporting a double walled vessel, flask or the like 17. This vessel is of the customary evacuated type and has its upper neck 18 closed by a stopper 19. Stopper 19 rests against the cushion 15 so that its accidental dislodgment is prevented and the vessel 17 supported between the cushion 15 and the spring 16 to avoid breaking in use.

The handle 5 is attached to the circular side wall of the container 6 by means of a lower strap 20 and an upper strap 21. The lower strap 20 has its ends attached to a bolt 22 extending transversely from the seating projection 9. This bolt when drawn up clamps the strap 20 tightly around the container 4.

In like manner strap 21 is bolted by means of bolt 23 tightly around the container 4 and to the upper projection 12. In this instance, however, the strap 21 is extended around the upper section 11 of the hollow handle (Figs. 2 and 3).

The assembly of this device will be readily understood. The straps 20 and 21 when passed around a suitable container 4 may be constricted to clamp the container tightly against the projections 9 and 12. In this manner the handle member 5 provides a convenient, durable handle for an otherwise awkward container.

The hollow handle member with its contained vessel provides for transport of a second liquid or ingredient which may according to circumstances be kept at a desired temperature. Thus cream can be carried cold in the smaller vessel while the beverage such as coffee or water for tea may be preserved heated in the vessel of the larger container.

The contents of either vessel may be withdrawn separately without disturbing the other and if desired the contents may then be mixed. In this way the flavor and freshness may be preserved and no risk of spoilage encountered.

While I have shown the preferred form my invention is defined solely by the scope of the appended claims and a wide latitude is possible in design, arrangement, proportions and the substitution of suitable materials.

What I claim is:

1. In combination, a container, a hollow member, means for attaching the hollow member to the container and a vessel contained within said hollow member.

2. In combination, a container, a hollow member, a plurality of straps held by said member in clamping engagement with the container and a vessel contained within said hollow member.

3. In combination, a container, a hollow member having spaced curved seating projections, a plurality of straps bolted through said projections and clamped around the container and a vessel contained within said hollow member.

4. In combination, a container, a hollow member having spaced upper and lower seating projections, a strap around both the container and hollow member, attaching means for said strap to the upper projection, a strap around the container and means to attach the ends of said strap to the lower projection.

5. In combination, a container, a hollow member, means for attaching the hollow member to the container, a double walled insulating vessel contained within said hollow member, a stopper for said vessel and a cap for the hollow member adjacent the stopper.

6. A handle comprising a hollow body member, means for attachment to an article, a vessel within the body member, a stopper for said vessel and a screw cap for the end of the body member adjacent the stopper.

7. Means for temporarily keeping two conjointly usable liquids at different temperatures comprising in combination an insulated container for one of the liquids, a hollow member, a plurality of straps held by said member in clamping engagement with the container and an insulated vessel for the other liquid contained within the said hollow member.

FERRELL E. BRYANT.